June 23, 1931.  F. W. TEMPLE  1,811,598
AMPLIFYING HORN
Original Filed Aug. 1, 1927  5 Sheets-Sheet 1

Witness:
William P. Kilroy

Inventor
Fred W. Temple

June 23, 1931.　　　　F. W. TEMPLE　　　　1,811,598
AMPLIFYING HORN
Original Filed Aug. 1, 1927　　5 Sheets-Sheet 2

Inventor:
Fred W. Temple

June 23, 1931.    F. W. TEMPLE    1,811,598
AMPLIFYING HORN
Original Filed Aug. 1, 1927    5 Sheets-Sheet 3

Witness:
William P. Kilroy

Inventor:
Fred W. Temple
By Hill & Hill
Attys

June 23, 1931.  F. W. TEMPLE  1,811,598
AMPLIFYING HORN
Original Filed Aug. 1, 1927   5 Sheets-Sheet 4

Witness:
William P. Kilroy

Inventor:
Fred W. Temple

June 23, 1931.  F. W. TEMPLE  1,811,598
AMPLIFYING HORN
Original Filed Aug. 1, 1927  5 Sheets-Sheet 5

Witness:
William P. Kilroy

Inventor:
Fred W. Temple
By
Attys

Patented June 23, 1931

1,811,598

UNITED STATES PATENT OFFICE

FRED W. TEMPLE, OF CHICAGO, ILLINOIS, ASSIGNOR TO TEMPLE, INC., OF CHICAGO, ILLINOIS, A CORPORATION OF ILLINOIS

AMPLIFYING HORN

Original application filed August 1, 1927, Serial No. 209,730. Divided and this application filed November 19, 1927. Serial No. 234,486.

My invention relates to amplifying horns and more particularly to amplifying horns adapted to be employed in connection with radio receiving apparatus or the like.

A particular object of the invention is to provide devices of the kind described that are neat and attractive in appearance, compact, efficient and satisfactory for use wherever found applicable.

Another object of the invention is to provide devices of the kind described which are of sturdy construction so that they may be easily packed for shipping purposes.

Another particular object of the invention is to provide amplifying horns comprising parts which may be quickly and easily assembled.

Still another particular object of the invention is to provide an improved amplifying horn which will amplify the sounds received from a receiving unit for distribution thereof.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

This application is a division of my co-pending application S. N. 209,730, filed August 1, 1927.

Figure 8:
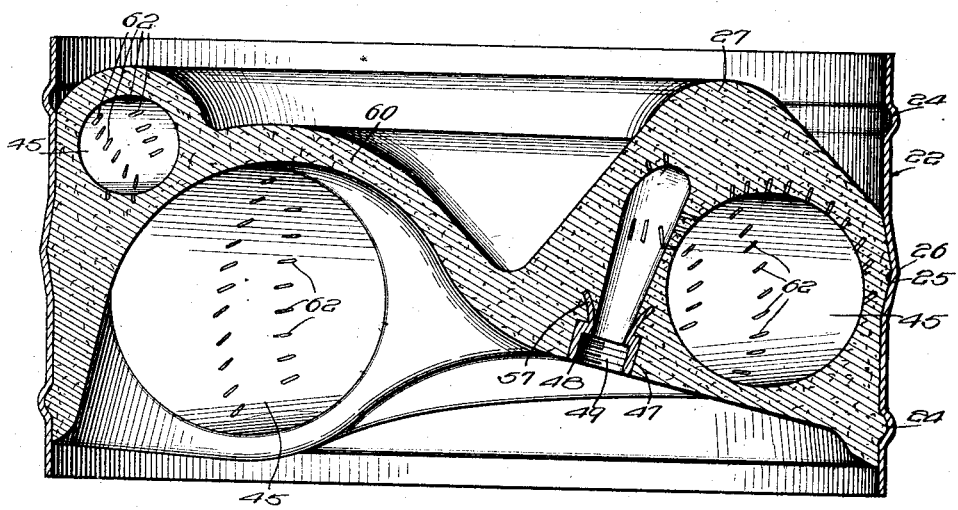
Fig. 8 is a section taken on line 8—8 of Fig. 6.
Figure 9:
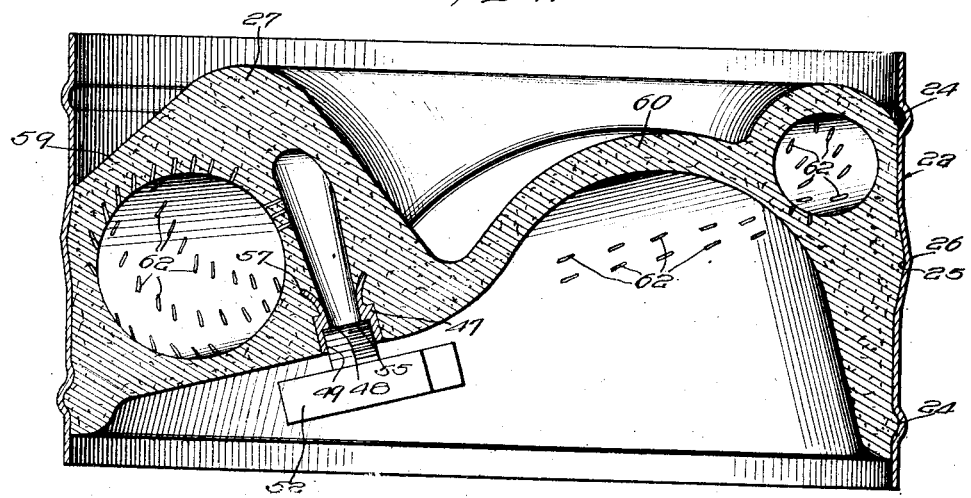
Fig. 9 is a section taken on line 9—9 of Fig. 6.
Figure 10:
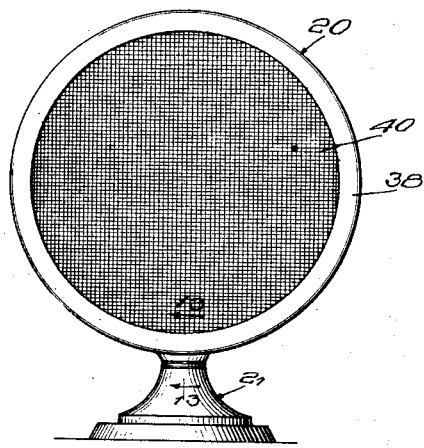
Fig. 10 is a front elevation of my improved amplifying horn.
Figure 11:
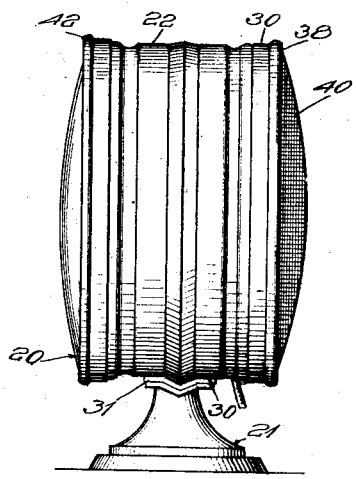
Fig. 11 is a side elevation of my improved amplifying horn.

Referring for the present to Figs. 8 to 15 inclusive, wherein I have illustrated certain details of construction of my improved amplifying horn, it will be noted that the horn preferably comprises a substantially cylindrical body portion 20 which is mounted upon a suitable base 21. The body portion 20 preferably comprises a shell or housing member 22 which, in the preferred embodiments of the invention, is preferably cylindrical in form and is preferably constructed of sheet metal. As best shown in Figs. 8 and 9, the interior surface of the housing member 22 is preferably provided with annular grooves 24, or the equivalent, and with an annular groove 25 or the equivalent, which is disposed intermediate the annular grooves 24. The annular grooves 24 and 25 form annular shoulders and insure that a molded body 27 disposed within the housing 22 will not be accidentally displaced therefrom as portions of the molded body 27 project into the grooves. It will be noted that when the annular groove 25 is formed in the inner surface of the housing member 22, an outwardly projecting annular portion 26 is simultaneously formed upon the exterior surface of the housing member 22. The annular portion 26 preferably conforms to the shape of a substantially V-shaped groove 30 formed in an arcuate saddle 31 upon which the housing member 22 is mounted (see Fig. 11). The saddle 31 is preferably clamped between the housing member 22 and the base 21. Thus, a nut 32, or the equivalent, embedded in the molded body 27 is engaged by a bolt 34, or the equivalent, the head of which engages the base 21 (see Fig. 13). The shank of the bolt 34 preferably extends through suitable apertures formed in the base 21 and in the saddle 31 and through a suitable aperture 35 formed in the housing member 22. The shank of the bolt 34 also projects through a washer 37 which is also preferably embedded in the molded body 27. The construction is such that the bolt 34 cooperates with the nut 32 to rigidly secure the body portion 20 and the saddle 31 to the base 21.

The front end of the housing member 22 is preferably covered with a closure member or end device 38 which preferably comprises an annular member 39 engageable with the housing member 22 and a foraminous member 40 which is carried by the annular member 39. The other end of the housing member 22 is preferably closed by a sheet metal cover 42.

Figure 7:
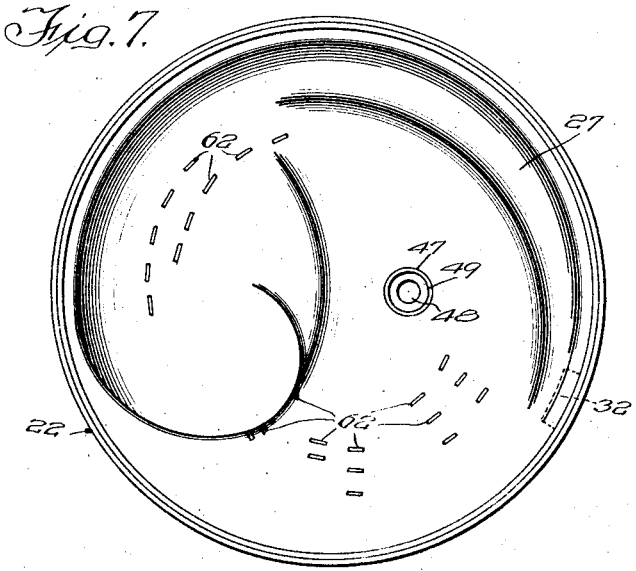
Fig. 7 is a front elevation of my improved amplifying horn as it appears before the front end is closed by a fabric or foraminous member and before the reproducing unit and the base are attached to the horn.
Figure 15:
Fig. 15 is a central longitudinal section taken through a nipple or insert which is preferably embedded in the molded part of each horn to hold the receiving unit.
Figure 14:
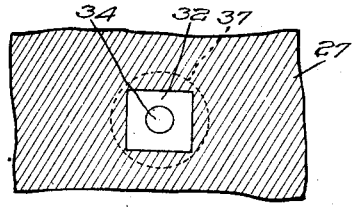
Fig. 14 is a section taken on line 14—14 of Fig. 13.

Referring to Figs. 8 and 9, it will be noted that the molded body 27 is provided with a more or less helically or spirally arranged tapering sound passage 45. As best shown in Fig. 7, the outer or discharge end of the sound passage 45 is relatively large and, by referring to the other figures, it will be noted that the sound passage gradually diminishes in diameter or cross-sectional area from the discharge end thereof to the other end thereof and that the latter end communicates with a tubular nipple 47 which is embedded in the molded body 27. As best shown in Figs. 9 and 15, the nipple 47 is provided, at its inner end, with a bore 48 which is preferably of the same diameter as the smaller end of the sound passage 45, the bore 48 being concentrically arranged with a bore 49 of larger diameter which is formed in the outer end of the nipple and forms an enlarged continuation of the bore 48. The bore 49 is preferably screw-threaded so that a reproducing unit 52 of the type commonly employed amplifying horns, or the equivalent, may be secured to the nipple. A foraminous member or screen 53, or the equivalent, preferably rests upon an annular shoulder 55 formed between the bores 48 and 49 and is held in place thereon by the reproducing unit 52. This screen prevents dust, or the like, from drifting into the reproducing unit. As shown, the nipple 47 is preferably provided with integral lugs or fingers 57 which are arranged concentrically around the bore 48 and project into the molded body 27 to prevent accidental displacement of the nipple relative thereto. Another function of the lugs or fingers 57 will presently appear.

As illustrated in Figs. 8 and 9, a relatively small amount of molding material is employed to form the molded body 27, the arrangement being such that a wall 59 of suitable thickness is provided around the sound passage 45 throughout its length and a web 60 of molding material extends between the turns of the passage. Embedded in the wall 59 of the passage 45 are one or more helical springs 62 which lie in close proximity to the passage 45 and incidentally serve to reinforce the wall. The primary function of the spring or springs 62 is not to reinforce the structure but is rather to serve as spacing means for a flexible core 64 during the casting or molding operation.

Figure 1:
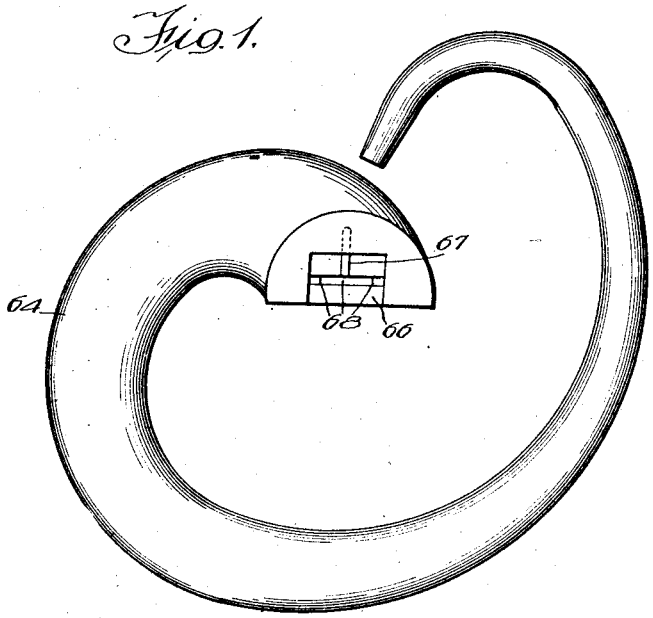
Fig. 1 is an elevation of a flexible core forming part of molding apparatus which embodies one embodiment of the invention.
Figure 2:
Fig. 2 is a side elevation of a helical spring which I preferably employ in connection with the flexible core shown in Fig. 1.

The flexible core 64 is best shown in Fig. 1 and is preferably formed of a high grade glue comprising gelatine. Of course, the core 64 conforms to the shape of the sound passage 45, the core being tapered from one end thereof to the other end thereof. It will be noted that at its larger end, the core 64 is provided with a recess 66 and with an eye 67, or the equivalent, which has its shank embedded in the core. The eye 67 projects into the recess 66 and may be engaged by any suitable tool when the core is to be withdrawn from molded body 27 after the molding or casting operation. I preferably provide the core 64 with an inwardly projecting flange or tongue 68 which is arranged in the recess 66 (see Figs. 1 and 4).

Figure 4:
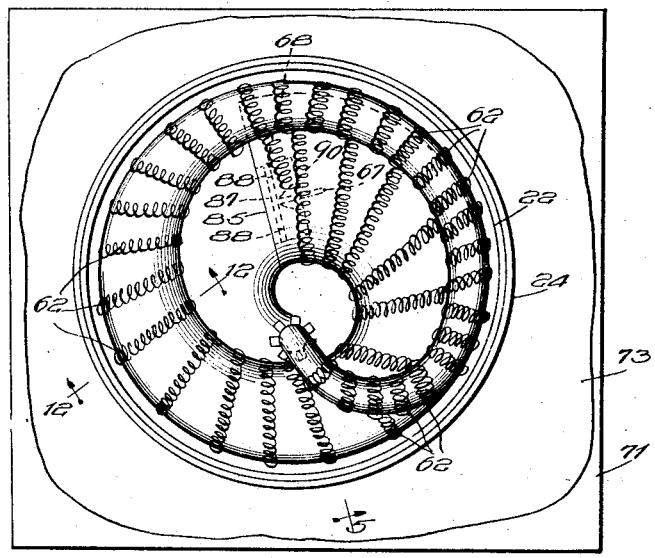
Fig. 4 is a plan elevation of part of my improved molding apparatus, one of the molding members which closes the top of the mold cavity during the molding operation being omitted from the drawings.
Figure 5:
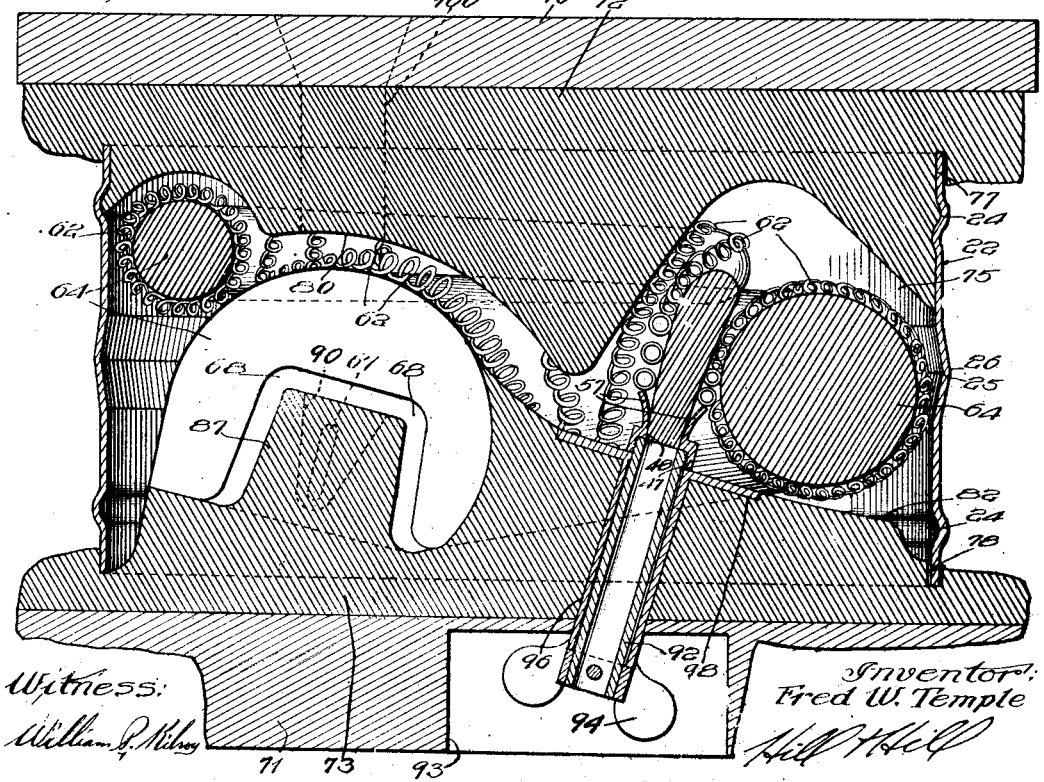
Fig. 5 is a section taken substantially on line 5—5 of Fig. 4 but in this instance, the upper molding member is shown in place to close the upper end of the mold cavity.
Figure 6:
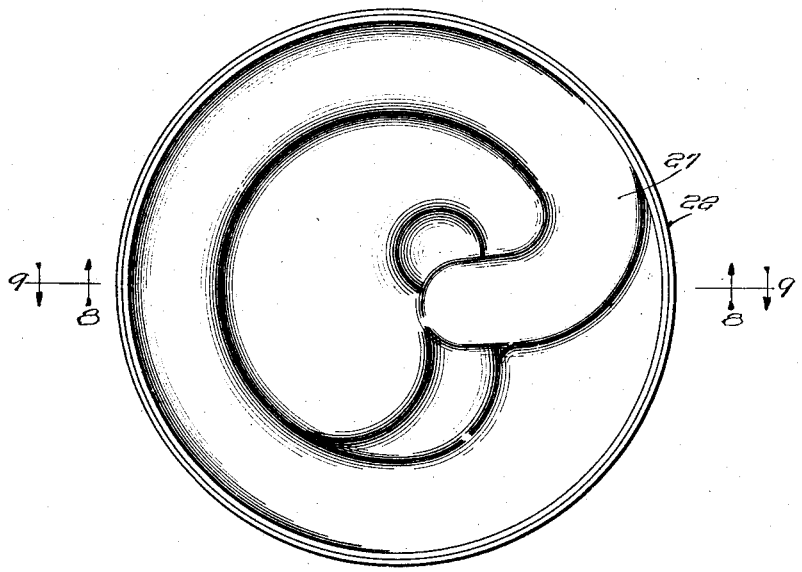
Fig. 6 is a rear elevation of my improved amplifying horn as it appears before the base is attached thereto and before the rear end is closed by a cover plate.

As best illustrated in Fig. 5, the mold in which the body 27 is molded preferably comprises upper and lower molding blocks or plates 70 and 71, respectively. Secured in any suitable manner to the molding blocks or plates 70 and 71 are molding members 72 and 73, respectively, which are preferably formed from material substantially identical with the material from which the core 64 is formed. The molding members 72 and 73 cooperate with the housing member 22 to provide a mold cavity 75, it being understood that each housing member 22 is employed in only one molding operation and that when the molded body 27 has been formed therein, the housing member remains permanently secured thereto. The molding members 72 and 73 are preferably formed with substantially cylindrical surfaces 77 and 78, respectively, which are adapted to fit snugly within the interior cylindrical surface of each housing member 22. The housing member 72 is provided with a molding surface 80 adapted to shape the rear surfaces of the molded members 27 and the member 73 is preferably provided with a molding surface 82 adapted to form the front surfaces or faces of the molded members 27. As best illustrated in Figs. 4 and 5, the member 73 is preferably provided with a relatively large integral extension or lug 85 adapted to form the mouths or larger openings of the sound passages 45, the extension or lug 85 being preferably provided with an integral lug 87 adapted to fit snugly within the recess 66 of the core 64. The lug 87 is preferably provided with a groove 88 adapted to accommodate the flange or tongue 68. When, as hereinafter explained, the core 64 is assembled with the member 73, the recess 66 in the larger end of the core is pushed over the lug 87 in such manner that the flange or tongue 68 seats in the groove 88 and thereby secures the core to the extension or lug 85. It will be noted that the lug 87 is provided with a recess 90 which is adapted to receive the eye 67.

During the molding or casting operation the aforementioned nipple 47 is held in place in the mold cavity 75 by means preferably comprising a tubular member 92 which projects through the member 73 and is provided with screw-threads at its inner end adapted to engage the screw-threads formed in the bore 49 of the nipple. The outer end of the tubular member 92 projects into a recess 93 formed in the bottom surface of the molding block or plate 71 and is provided with a handle member 94 whereby the tubular member may be rotated to unscrew it from the nipple. In the preferred embodiments of the invention, a tube 96 preferably extends through the member 73 and provides a permanent passage through which the tubular member 92 may be passed to have its screw-threaded end engage the nipple. The tube 96 is embedded in the member 73 and is not readily removable therefrom. It will be noted that the tube 96 is provided with an annular flange 98 at its inner end which forms part of the surface of the mold cavity 75.

Figure 12:
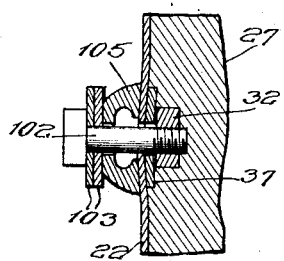
Fig. 12 is an enlarged fragmentary section taken on line 12—12 of Fig. 4.
Figure 13:
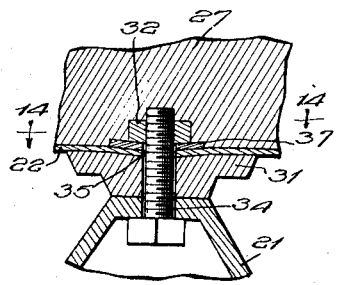
Fig. 13 is an enlarged fragmentary section taken on line 13—13 of Fig. 10.

In Fig. 12 I have illustrated apparatus which I employ during the molding operations to embed the nuts 32 in the molded bodies 27. As shown, I provide a bolt 102 adapted to be screw-threaded into the nuts 32 and adapted to hold the washers 37. Carried by the shank of the bolt 102 are one or more washers 103 and a flexible washer or flexible tubular member 105 which preferably fits loosely upon the shank of the bolt 102 and is adapted to be clamped between the washers 103 and the outer surface of the housing member 22. The arrangement is such that if during the molding operation any of the molding material flows out of the housing member 22 by way of the apertures 35, it will collect within the tubular member 105 and will not flow out upon the support upon which the molding apparatus is positioned as the tubular member 105 may be sufficiently compressed to form a liquid tight joint with the tubular member 22 and with the washer 103 engaged by it. The washer or tubular member 105 is preferably formed from rubber, or the equivalent.

Figure 3:
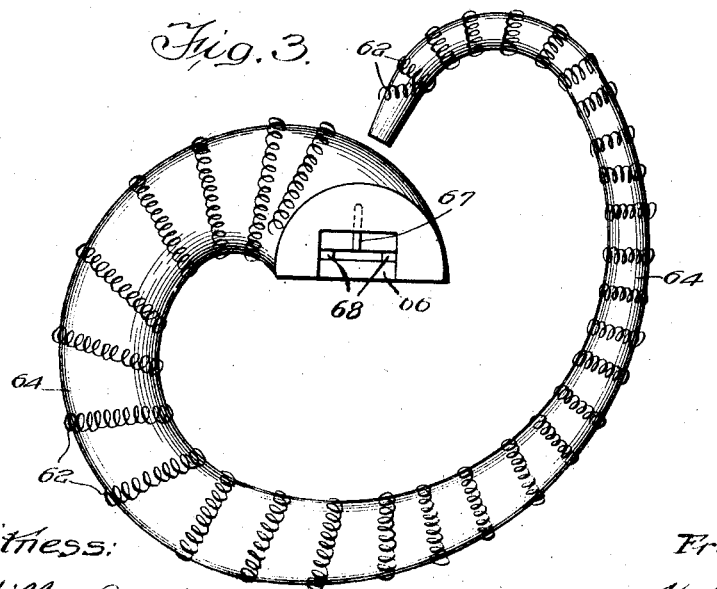
Fig. 3 is an elevation of the flexible core shown in Fig. 1, the helical spring illustrated in Fig. 2 being shown wrapped around the core.

When a molded body 27 is to be formed in the above described molding apparatus, the operation is substantially as follows: The tubular member 92 is passed through the tube 96 and a nipple 47 is secured to its screw-threaded end in the manner illustrated in Fig. 5. The molding block or plate 71 and the molding member 73 carried thereby are then positioned upon any suitable support. The bolt 102, the washers 103 and the tubular member 105 are then employed to secure a nut 32 and a washer 37 to a housing member 22 which is then positioned upon the member 72 as illustrated in Fig. 5. Then, after greasing the core 64, I preferably wind one or more springs 62 around it in the manner illustrated in Figs. 3 and 4, it being readily understood that a relatively long spring 62 or a plurality of shorter springs 62 may be employed as desired. The core 63 is then positioned upon the member 73 in such manner that the lug 87 projects into the recess 66 and the flange or tongue 68 projects into the groove 88. In some instances I wind the spring 62 around the core after it has been assembled with the member 73. Then, as illustrated in Fig. 4, I coil the flexible core 64 in such manner that the smaller end thereof may be introduced into the bore 48 formed in the nipple 47. Of course, the lugs or fingers 57 serve as guides when the small end of the core is inserted in the bore 48 and also prevent lateral displacement thereof if it is accidentally withdrawn a short distance from the bore. It will be noted that the spring 62 spaces the core 64 from the interior cylindrical surface of the housing member 22 and that it spaces the super-imposed turns of the core from each other, so that after the molded member 27 has been formed, one turn of the sound passage 45 will not communicate with another turn thereof through the wall which separates them. Obviously, the helical spring 62 permits the molding material to flow freely around the core 64 and becomes embedded in the molding material when it sets. It may be mentioned at this point in the description that I preferably form the molded members 27 from molding plaster or some equivalent or similar material.

After the core 64 has been properly arranged within the housing member 22, the molding material, which is in liquid state, is poured into the housing member 22 and then the molding plate 70 and its associated member 72 are positioned upon the upper end of the housing member 22 in the manner illustrated in Fig. 5. Any excess of molding material flows up through one or more risers 100 which extend through the member 72 and the molding plate 70. After the molding material is set, the molding apparatus is turned over so that the molding plate or block 70 rests upon the support, thus permitting the tubular member 92 to be rotated to disengage it from the nipple 47. The molding plate or block 71 and the member 73 are then lifted from the remaining molding apparatus and the eye 67 is engaged by any suitable tool (not shown) and the flexible core 64 is withdrawn from the newly formed molded body 27. In the next step of the molding operation, the operator removes the molding plate or block 70 and the member 72 from the housing member 22 and unscrews the bolt 102 so that the tubular member 105 and the washers 103 may be removed from the housing member 22. Each housing member 22 with its associated molded member 27 is then assembled with a reproducing unit 52 and with a base 21 in the manner illustrated in Figs. 10, 11 and 13.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. An amplifying horn comprising a massive-like member having passage therein, means forming a chamber directly in front of the outlet end of said passage, and a reproducing unit disposed in said chamber and communicating with the inlet end of said sound passage.

2. An amplifying horn comprising a tubular housing, a member provided with a sound passage therethrough and mounted in said housing, a cover for one end of said housing, said cover and said member being arranged to devise a chamber within said housing communicating with the outlet end of said sound passage, and a reproducing unit disposed in said chamber and communicating with the inlet end of said sound passage.

3. An amplifying horn comprising a tubular housing, covers for the ends of the housing, a body member snugly fitted within and occupying the confines of the housing provided with a sound passage therethrough, and a reproducing unit mounted in said housing and communicating with one end of the sound passage.

4. An amplifying horn comprising a tubular housing, covers for each end of the housing, a one-piece integral and continuous body member mounted in the housing and provided with a sound passage therethrough, and a reproducing unit mounted on said member and communicating with one end of the sound passage.

5. An amplifying horn comprising a housing, a member mounted in said housing and occupying the entire space thereof and provided with a sound passage therethrough, a reproducing unit communicating with the sound passage, a base, and means projecting through the housing for connecting said member to said base.

6. An amplifying horn comprising a one piece, integral, and massive-like member provided with a sound passage having a convolution therein, the inlet and outlet ends of said passage being disposed adjacent each other on the same end of said member, and a reproducing unit positioned at said inlet end and communicating with said sound passage.

7. An amplifying horn comprising a tubular housing, a body member disposed in said housing and provided with a curved sound passage having more than one complete turn through 360°, a reproducing unit carried by said member and communicating with one end of said sound passage, and closure devices for the ends of the tubular housing, said body member connecting the turns constituting the sound passage.

8. An amplifying horn comprising a tubular housing, a member disposed in said housing and provided with a curved sound passage therethrough, both ends of said sound passage opening into the same end of said member, a reproducing unit carried by said member and communicating with one end of said sound passage, and detachable closure devices for the ends of said tubular member.

9. An amplifying horn comprising a tubular housing, a member disposed in said housing and forming a partition transversely thereof, said member being provided with a coiled sound passage having at least one complete turn therein, and a reproducing unit disposed in said housing and communicating with one end of said sound passage.

10. An amplifying horn comprising a member having a convoluted sound passage therein, said sound passage having an inlet end and a discharge end, the inlet end of said sound passage passing through said convolution, and a reproducing unit communicating with said sound passage and disposed to open in substantially the same direction as said discharge end.

11. An amplifying horn comprising a housing formed of a tube of sheet metal, a body member mounted within said housing and having a tortuous sound passage therein, a metallic cap closing one end of the housing member and a metallic annulus seated upon the adjacent end of the housing member having a foraminous element carried thereby.

12. An amplifying horn of the character described comprising a shell element having a body member therein provided with a helically coiled sound passage having at least one complete turn, one end of the passage extending horizontally between the turn of the sound passage and a reproducing element associated with the extremity of one end of the passage.

13. An amplifying horn comprising a body member having a suitable base for supporting the same, said body member having formed therein at least one vertically disposed convolution of tapering formation constituting the sound passage, one end of the sound passage being substantially horizontally disposed and extending through the convoluted sound passage aforesaid, and a reproducing element associated with the passage.

14. An amplifying horn comprising a body element having formed therein a sound passage comprising a plurality of vertically disposed convolutions of helical formation, a web extending between the turns of the passage, a reproducing element associated with the passage, an end device closing one end of the body element and a separate end device closing the adjacent end of the body.

15. An amplifying horn of the character described, comprising a base, a tubular body portion associated with the base and supported thereby, said body portion having formed therein a plurality of vertically disposed convolutions constituting a tortuous sound passage of relatively long character within the relatively small space provided by said body portion, one end of the sound passage extending through the convolutions, said body portion having a web extending between the turns of the convolutions of substantially concavo-convex formation.

16. An amplifying horn comprising a base, a body portion mounted on the base having a sound passage of convoluted formation therein and of substantially vertical disposition with respect to the base, the sound passage having inlet and outlet ends disposed adjacent each other on the same side of the body portion, a reproducing unit positioned at the inlet of the sound passage and communicating therewith, a web of irregular formation joining the said convolutions, an end cap secured to one side of the body portion and an end device having a foraminated element secured to the adjacent side thereof.

17. An amplifying horn comprising a body member having formed near the peripheral edge thereof, a convoluted sound passage connected by a web portion of the body member, one end of the sound passage passing through the aforesaid convolutions, and a reproducing unit communicating with said sound passage.

18. An amplifying horn comprising an integral body member having a convoluted sound passage therein of substantially vertical disposition, the convoluted portion being joined and made integral with the material of the body member, one end of the sound reproducing unit passing through said convolution and discharging from one side of the body member, and the other end of the convolution discharging from the same side in close proximity to the first-named end, and a reproducing unit communicating with one of the ends of the sound passage.

19. An amplifying horn comprising a housing, a body member positioned in said housing and forming a partition, and spaced from the front end thereof to provide a chamber at said front end, said member being provided with a sound passage having its inlet end opening into said chamber and a reproducing unit disposed in said chamber and communicating with the inlet end of the sound passage.

20. An amplifying horn comprising a housing and a member positioned in said housing and forming a wall extending transversely thereof, said member being provided with a substantially helical sound passage having at least one complete turn therein.

21. An amplifying horn comprising a member having a substantially helical sound passage therein of more than one complete turn, transversely disposed means for connecting the turn constituting the passage and a reproducing unit communicating with one end of the sound passage.

22. An amplifying horn comprising a tubular member, closure members for the ends of said tubular member, one of said closure members having a foraminous wall therefor, a massive-like body member fixed in said tubular member and provided with a sound passage and a reproducing unit carried by the sound passage member and communicating with one end of the sound passage.

23. An amplifying horn comprising a transversely disposed body member, having a tortuous sound passage therein, a reproducing unit carried by the body member and communicating with one end of the sound passage, said body member being recessed in one side thereof to define a chamber communicating with the outlet of the passage.

24. An amplifying horn having a tubular housing, a body member of considerable width transversely disposed within the housing and provided with a convoluted sound passageway near the periphery thereof, said body member constituting a partition joining the convolutions constituting the sound passage, a reproducing unit carried by the body member and communicating with one end of said sound passage.

25. An amplifying horn having a tubular housing, a body member of considerable width transversely disposed within the housing and provided with a convoluted sound passageway near the periphery thereof, said body member constituting a partition joining the convolutions constituting the sound passage, a reproducing unit carried by the body member and communicating with one end of said sound passage, said body member being provided with a cup-like recess in at least one side thereof constituting a chamber communicating with the outlet end of the passage.

26. An amplifying horn including a body member of wavy-like formation to provide a chamber in at least one side thereof, said body member having a vertically disposed convolution of tapered formation located in substantially the circumferential periphery thereof, the convolutions of which are connected by the body member, one end of the passage extending through the aforesaid convolution and the other end terminating in the same side of the body member and communicating with the said chamber, an end device secured to the body member and closing the said chamber.

27. An amplifying horn of the character described, comprising a tubular shell, a support therefor, a body portion of considerable width disposed within the shell and provided with a sound passage having at least one convolution, the material of the body portion connecting the convolution aforesaid, an amplifying unit connected with the inlet end of the sound passage and a closure device attached to the shell concealing the said reproducing unit.

28. An amplifying horn of the character described comprising a body member having at least one convolution formed therein near the circumferential periphery thereof constituting a sound passage, said body member having a connecting web-like portion joining the convolution, the inlet end of the sound passage being horizontally disposed with respect to the body portion and provided with a reproducing unit, and the outlet end of the sound passage discharging from the same side of the body in close proximity to the inlet thereof.

29. An amplifying horn comprising a tubular shell, a body member located within and supporting said shell, said body member being shaped to form a chamber in at least one side thereof, a helical sound passage formed in the body having its outlet terminating in the chamber provided in one side thereof, and a reproducing unit cooperatively secured to the body portion in communication with the inlet of the sound passage, and a cover detachably secured to the tubular shell for closing the chamber and rendering the reproducing unit accessible upon the removal of the cover.

30. An amplifying horn comprising a housing member having a plurality of walls including a foraminous wall, a massive-like body member disposed in said housing and provided with a tortuous sound passage having an inlet end and an outlet end both opening toward said foraminous wall, and a reproducing unit communicating with said inlet end.

31. An amplifying horn comprising a massive body member having a helically coiled sound passage therein of more than one turn, said body member forming the walls of said sound passage, and a reproducing unit carried by said member and communicating with one end of said sound passage.

In testimony whereof, I have hereunto signed my name.

FRED W. TEMPLE.